C. BERGMANN, Jr.
AUTOMATIC CLUTCHING OR STARTING DEVICE.
APPLICATION FILED DEC. 23, 1916.

1,254,196.

Patented Jan. 22, 1918.

WITNESSES:

INVENTOR
Carl Bergmann, Jr.
By Attorneys,

UNITED STATES PATENT OFFICE.

CARL BERGMANN, JR., OF WEST HOBOKEN, NEW JERSEY.

AUTOMATIC CLUTCHING OR STARTING DEVICE.

1,254,196.  Specification of Letters Patent.  Patented Jan. 22, 1918.

Application filed December 23, 1916. Serial No. 138,546.

*To all whom it may concern:*

Be it known that I, CARL BERGMANN, Jr., a citizen of the United States of America, residing in West Hoboken, in the county of Hudson and State of New Jersey, have invented certain new and useful Improvements in Automatic Clutching or Starting Devices, of which the following is a specification.

This invention relates to automatic clutching or starting devices, especially applicable for automobile engines, and aims to provide improvements therein.

The present invention provides a device which is of an improved nature as regards a resilient and easy action in starting, and it further provides a simple, efficient and cheaply manufactured device.

Several embodiments of the invention are illustrated in the accompanying drawings, wherein Figure 1 is a sectional view of one embodiment;

Figure 1:
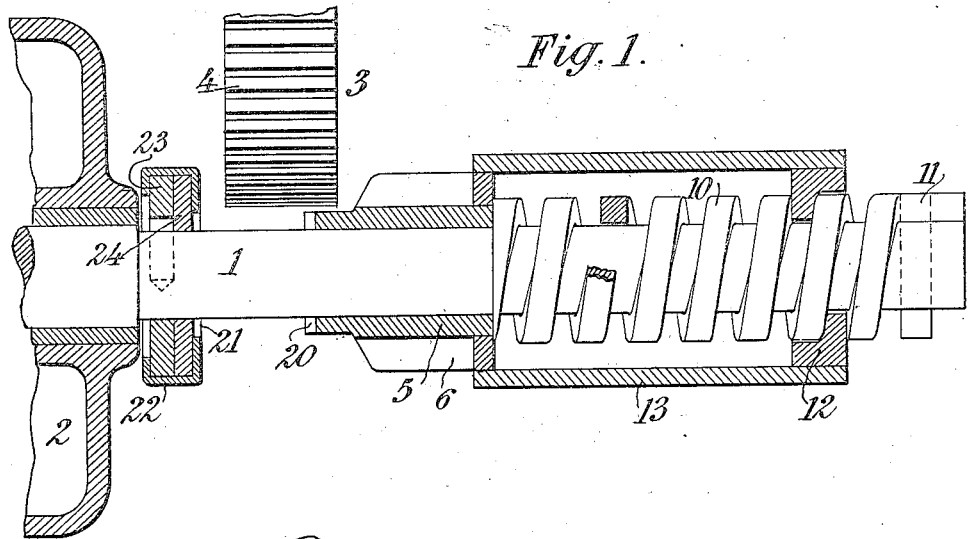

In said drawings, numeral 1 designates a driving shaft, the driving shaft being preferably connected directly to a motor 2, such as an electric motor. Shaft 1 may be manually operated, however. Numeral 3 designates a driven part, in the present instance being an engine fly-wheel.

Between the driving shaft 1 and driven part 3 there are means for automatically effecting a driving engagement and disengagement thereof. These means comprise an axially shiftable part 5, the parts 3 and 5 being conveniently formed with teeth 4 and 6 adapted to mesh when the parts are in alinement. Around the shaft 1 there is a coiled spring 10. The coiled spring is preferably made of a square bar or rod.

Figure 2:
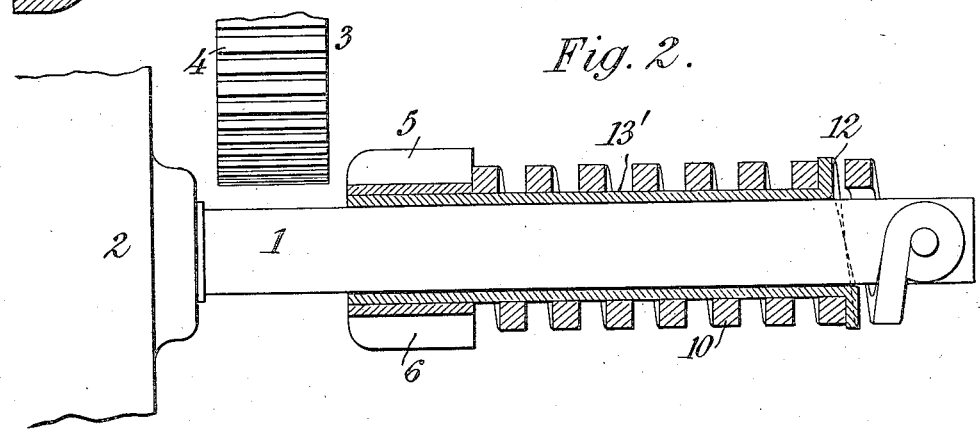
Fig. 2 is a sectional view of another embodiment.
Figure 3:
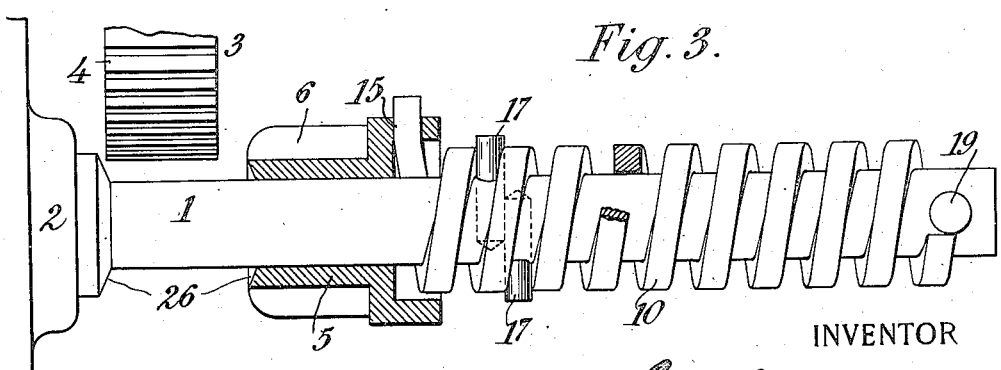
Fig. 3 is a sectional view of still another embodiment.

According to the invention relative movement between the driving part 5 and the spring 10, as shown in Figs. 1 and 2, may be produced (in which case the spring is made fast to the shaft 1), or, as shown in Fig. 3, the spring is fixed to the driving part 5, relative movement occurring between the spring and shaft 1.

As shown in Fig. 1, a pin 11 may be used to fasten the spring 10 to the shaft. The spring 10 acts as a thread, and imparts axial movement to the part 5 through a suitable nut 12 and a direct connection or sleeve 13.

To start an engine, or the like, the motor 2 is set in operation, rotating the shaft 1 and the spring 10 carried thereon. The spring 10, acting as a thread, shifts the driving part 5 axially into driving relation or mesh with the driven part or toothed fly-wheel of the engine. The inertia of the part to be set in motion, as the fly-wheel of an engine being, relatively great, the driving part 5 and the parts associated therewith are not usually designed to immediately start the engine. Hence the motor 2, shaft 1, and coiled spring 10, continuing to turn, the spring 10 yields until the strain thereon equals the resistance of the driven part, whereupon the driving part 5 begins to turn, and to turn the driven part 3, and hence accordingly start the driven part, as the engine. The spring acts as a cushion and enables the driven part to be started without undue shock upon either the driving or driven part. Furthermore, when the pinion in its axial movement does not immediately come into mesh with the teeth on the driven part, the spring permits of the shaft 1 continuing to turn until the toothed parts turn and slide into mesh.

After the engine, for example, begins to run under its own power, the radius of the driven part 3 is such that the driven part 3 imparts a motion to the driving part 5 faster or greater than the motion transmitted thereto (to the driving part 5) by the motor 2. In turning faster than the motor, and shaft and spring driven by the motor, the driving part 5 is caused by its threaded engagement with the spring 10, to move in a direction to carry the driving part 5 out of driving relation with the driven part 3. Thereupon (or previously) the motor 2 may be stopped.

In Fig. 2 the driving part 5 is shown as provided with a sleeve 13' between the spring 10 and the shaft 1. A nut 12 is provided upon the sleeve 13' for engaging the spring 10.

The operation of this embodiment of the device is similar to the embodiment shown in Fig. 1.

In the embodiment shown in Fig. 3 the spring 10 is fixed to the driving part 5, as shown at 15. Pins 17, 17 are fixed upon the shaft 1, the pins 17 bearing the relation of a nut to the thread formed by the coiled spring 10. 19 is an abutment which may be provided for limiting the axial movement in one direction of the coiled spring under the action of the pins 17, 17.

In this embodiment rotation of the shaft 1 causes the pins 17, 17 to move the coiled spring axially of the shaft, in a direction to bring the driving part 5 into driving relation with the driven part 3. When the parts 3 and 5 are in driving relation the spring 10 is compressed by the pins 17, 17 until the torque transmitted by the shaft 1 is sufficient to start the driven part 3 in motion, whereupon the parts 3 and 5 move until the running of the driven part or engine, as heretofore explained, causes the part 5 to run faster than the driving shaft, the relatively faster motion of the part 5 and spring 10 connected thereto causing the pins 17 to retract the driving part 5, thereby disengaging the driving and driven parts. The motor 2 may then, or previously, be stopped.

There may also be provided means, as shown in Figs. 1 and 3, for clutching the driving part 5 to the shaft 1. As shown in Fig. 1, the clutch is in the form of a friction clutch, the driving part 5 being provided with lugs 20 adapted to engage recesses 21 in a plate 22 frictionally mounted upon a collar 23 fixed upon the shaft 1. 24 designates a piece of friction material between the parts 21 and 23.

In Fig. 3 the clutch is shown as in the form of a pair of complementary cone parts 26.

From the foregoing it will be perceived that the construction is simple, the spring 10 serving as a screw-thread and the cutting of a screw-thread being avoided. The parts are few and easily obtained. An easy starting of the engine, or other driven part, is effected. Any uneven starting action of the engine will be taken up by the yielding action of the spring.

The inventive ideas of the invention may be otherwise expressed than in the embodiments herein specifically illustrated and described.

What is claimed is:—

1. A driven shaft, an axially movable driving part upon said shaft, a coiled spring, a complementary driven part, and means for producing relative axial movement between said shaft and one of said spring and driving part to bring said driving part into engagement with said complementary driven part.

2. A driven shaft, an axially movable driving part upon said shaft, a coiled spring of polygonal material, a complementary driven part, and means for producing relative axial movement between said shaft and one of said spring and driving part to bring said driving part into engagement with said complementary driven part.

3. A driven shaft, an axially movable driving part upon said shaft, a coiled spring fixed to said shaft, a complementary driven part, and means for producing relative axial movement between said spring and said driving part to bring said driving part into engagement with said complementary driven part.

4. A driven shaft, an axially movable driving pinion upon said shaft, a coiled spring fixed upon said shaft, a nut connected to said pinion and adapted to mesh with said coiled spring, a complementary driven part, and means for driving said shaft, said shaft, through the medium of the engagement of said spring and nut, shifting said driving pinion into engagement with said complementary driven part.

5. A driven shaft, an axially movable driving pinion upon said shaft, a coiled spring fixed upon said shaft, a nut, a sleeve connecting said nut to said pinion, said nut being adapted to mesh with said coiled spring, a complementary driven part, and means for driving said shaft, said shaft, through the medium of the engagement of said spring and nut, shifting said driving pinion into engagement with said complementary driven part.

6. A driven shaft, an axially movable driving part upon said shaft, a coiled spring, a complementary driven part, means for producing relative axial movement between said shaft and one of said spring and driving part to bring said driving part into engagement with said complementary driven part, and clutching parts upon said shaft and said driving part adapted to engage when said driving part is in engagement with said driven part.

In witness whereof, I have hereunto signed my name.

CARL BERGMANN, Jr.